United States Patent
Tao et al.

(10) Patent No.: US 10,106,142 B2
(45) Date of Patent: Oct. 23, 2018

(54) METHOD AND APPARATUS TO MONITOR A TEMPERATURE SENSOR

(71) Applicant: GM GLOBAL TECHNOLOGY OPERATIONS LLC, Detriot, MI (US)

(72) Inventors: Xuefeng T. Tao, Northville, MI (US); Parsa Mahmoudieh, Vallejo, CA (US); Michael Chernyak, Farmington Hills, MI (US); Zhenhu Zhuang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 464 days.

(21) Appl. No.: 15/041,667

(22) Filed: Feb. 11, 2016

(65) Prior Publication Data

US 2017/0232949 A1    Aug. 17, 2017

(51) Int. Cl.
*B60W 10/10* (2012.01)
*B60W 10/06* (2006.01)
*B60W 50/02* (2012.01)
*F16H 57/04* (2010.01)

(52) U.S. Cl.
CPC ............ *B60W 10/10* (2013.01); *B60W 10/06* (2013.01); *B60W 50/0205* (2013.01); *F16H 57/0413* (2013.01); *B60W 2050/0215* (2013.01); *B60W 2510/0676* (2013.01); *B60W 2510/107* (2013.01); *B60W 2710/06* (2013.01); *B60W 2710/10* (2013.01)

(58) Field of Classification Search
CPC .. B60W 10/06; B60W 10/10; B60W 50/0205; B60W 2510/0676; B60W 2510/107; B60W 2710/06; B60W 2710/10; F16H 57/0413
See application file for complete search history.

(56) References Cited

U.S. PATENT DOCUMENTS

| | | | | |
|---|---|---|---|---|
| 5,339,776 | A * | 8/1994 | Regueiro | F01M 1/16 123/196 AB |
| 5,657,722 | A * | 8/1997 | Hollis | F01P 7/167 123/41.08 |
| 6,279,390 | B1 * | 8/2001 | Oka | F01P 11/14 73/114.68 |
| 6,321,695 | B1 * | 11/2001 | Yoo | F01P 11/16 123/198 D |
| 8,364,364 | B1 | 1/2013 | Tao et al. | |
| 8,831,845 | B1 | 9/2014 | Tao et al. | |
| 8,914,186 | B2 | 12/2014 | Tao et al. | |

(Continued)

*Primary Examiner* — Marthe Y Marc-Coleman
(74) *Attorney, Agent, or Firm* — Quinn IP Law (57) ABSTRACT

A powertrain system including an engine and transmission is described, and includes a temperature sensor disposed to monitor a hydraulic fluid for the transmission. A method for monitoring the temperature sensor includes monitoring engine operation including engine coolant temperature and monitoring a signal output from the temperature sensor. An indicated temperature slope is determined based upon the signal output from the temperature sensor, and a temperature region associated with the engine coolant temperature is determined. Performance of the temperature sensor is evaluated based upon the indicated temperature slope and minimum and maximum temperature slope thresholds that are associated with the temperature region.

20 Claims, 3 Drawing Sheets

(56) References Cited

U.S. PATENT DOCUMENTS

| | | | |
|---|---|---|---|
| 2012/0330496 A1* | 12/2012 | Eser | F01P 11/16 |
| | | | 701/30.8 |
| 2013/0240315 A1 | 9/2013 | Tao et al. | |
| 2013/0282243 A1 | 10/2013 | Tao et al. | |
| 2015/0015803 A1 | 1/2015 | Wang et al. | |
| 2017/0321596 A1* | 11/2017 | Lee | F01P 7/167 |

\* cited by examiner

METHOD AND APPARATUS TO MONITOR A TEMPERATURE SENSOR

TECHNICAL FIELD

The disclosure relates to on-vehicle temperature sensors, and monitoring operation thereof.

BACKGROUND

Powertrain systems are equipped with on-board sensors that monitor powertrain operating parameters for purposes of control and diagnostics. Such sensors include devices for monitoring fluidic temperature, rotational position and speed, airflow, and others. Sensors may be monitored to verify sensor performance and integrity. Such monitoring may include evaluating signal continuity, e.g., detecting occurrence of electric grounding of an output signal or detecting occurrence of an open circuit associated with the output signal. There may be a further need to monitor sensor signal rationality to verify in-use that an output signal from a sensor is responsive to the operating parameter the sensor is monitoring.

SUMMARY

A powertrain system including an engine and transmission is described, and includes a temperature sensor disposed to monitor a hydraulic fluid for the transmission. A method for monitoring the temperature sensor includes monitoring engine operation including engine coolant temperature and monitoring a signal output from the temperature sensor. An indicated temperature slope is determined based upon the signal output from the temperature sensor, and a temperature region associated with the engine coolant temperature is determined. Performance of the temperature sensor is evaluated based upon the indicated temperature slope and minimum and maximum temperature slope thresholds that are associated with the temperature region.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
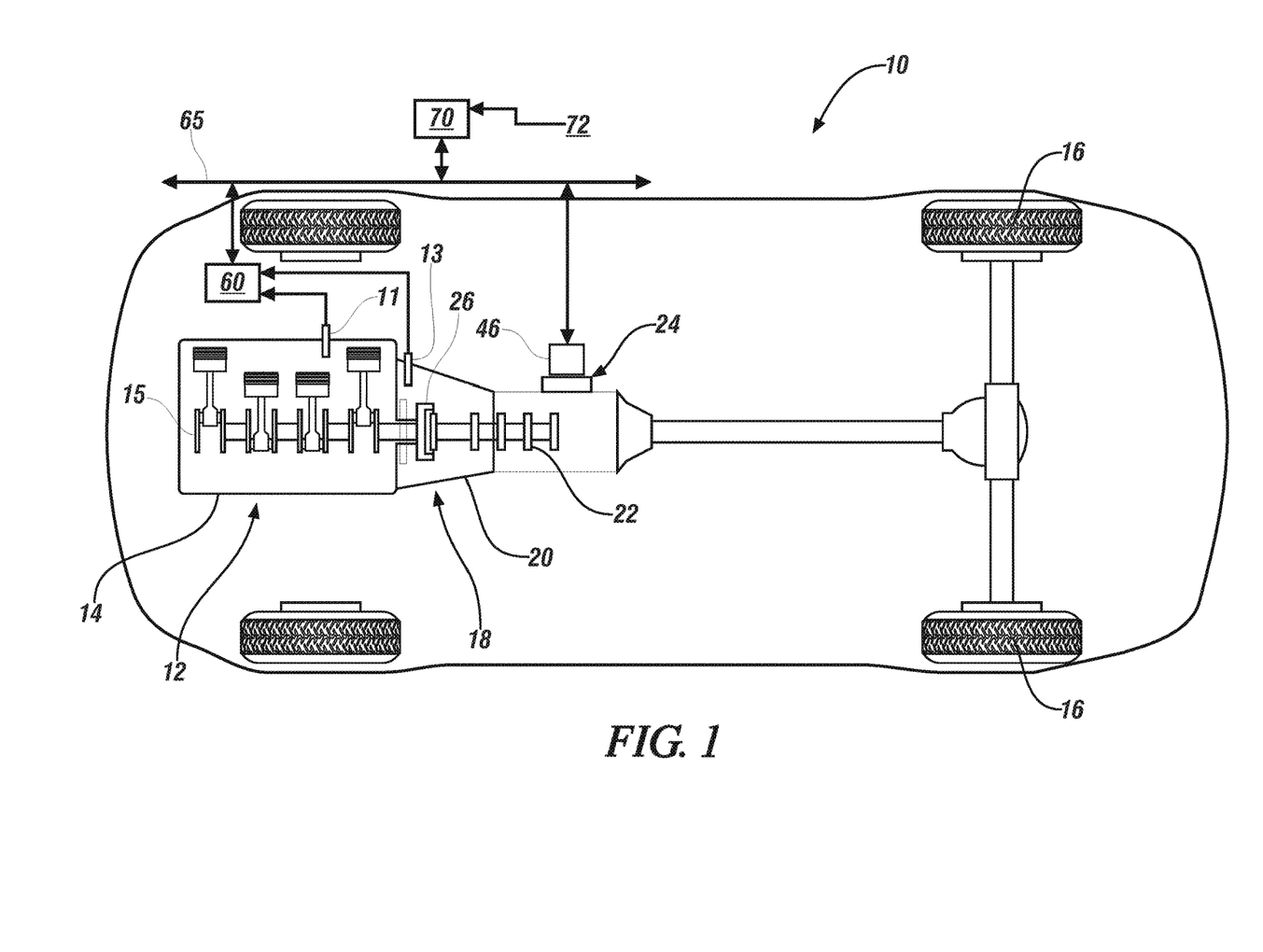
FIGS. 1 and 2 schematically illustrate a vehicle including a powertrain system that is configured to generate and transfer propulsion power to one or multiple drive wheels that are in contact with a road surface, in accordance with the disclosure.
Figure 2:
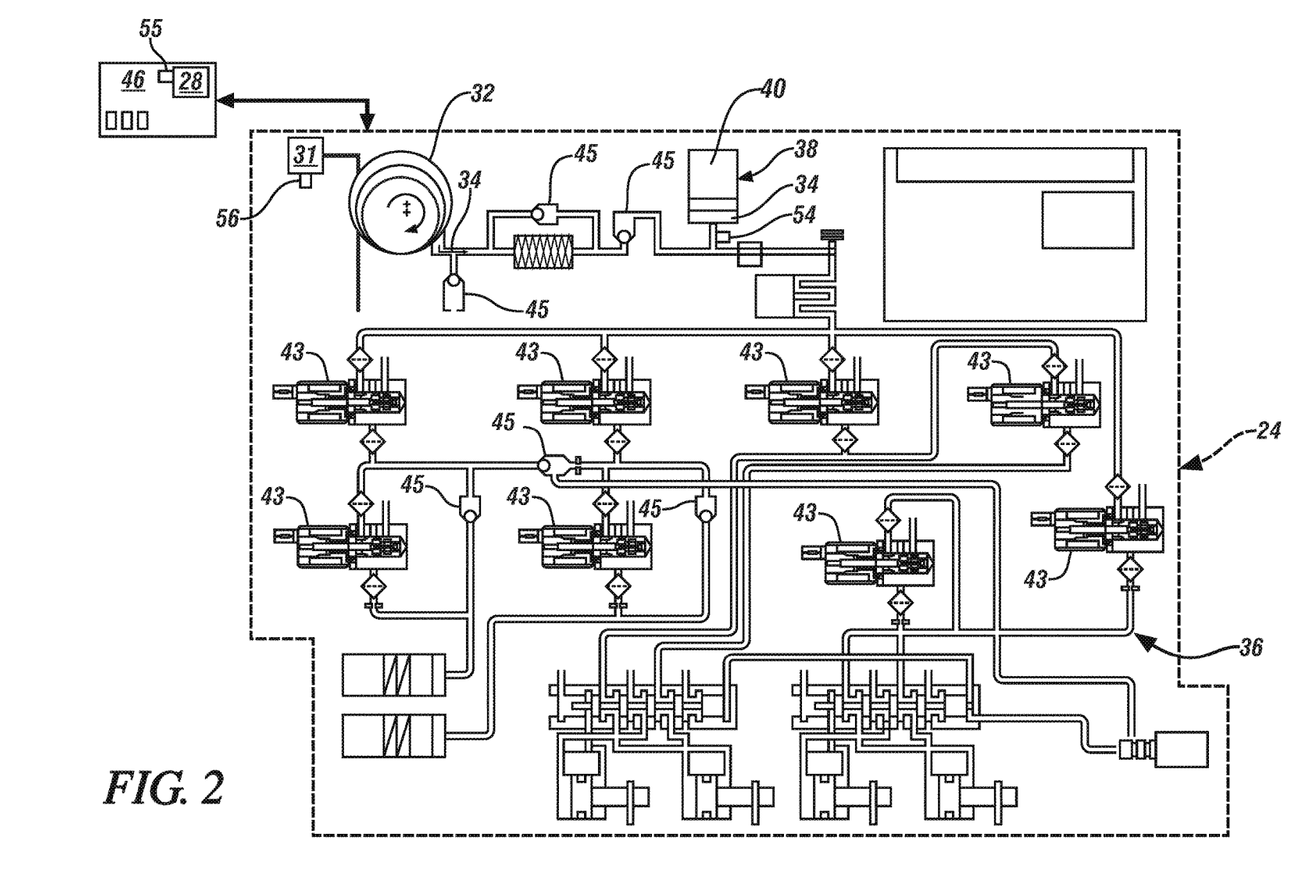

Referring now to the drawings, wherein the depictions are for the purpose of illustrating certain example embodiments only and not for the purpose of limiting the same, FIGS. 1 and 2 schematically illustrate a vehicle 10 including a powertrain system 12 that is configured to generate and transfer propulsion power to one or multiple drive wheels 16 that are in contact with a road surface. The vehicle 10 may include, by way of non-limiting examples, a passenger vehicle, a light-duty or heavy-duty truck, a utility vehicle, an agricultural vehicle, an industrial/warehouse vehicle, a recreational off-road vehicle, or another mobile platform. In one non-limiting embodiment, the powertrain system 12 includes an internal combustion engine (engine) 14 that may couple via a torque converter 26 to a transmission 18. Note: For our dual clutch transmission, there is no torque converter 26. In certain embodiments, the transmission 18 may be a dynamically-shiftable multi-speed dual-clutch transmission.

The engine 14 is preferably a multi-cylinder internal combustion engine that converts fuel to mechanical torque through a thermodynamic combustion process. The engine 14 is equipped with a plurality of actuators and sensing devices for monitoring operation and delivering fuel to form in-cylinder combustion charges that generate an expansion force onto pistons, with such force transferred to the crankshaft 15 to produce torque. One sensing device for monitoring the engine 14 is a Hall-effect sensor 13 or another suitable sensor that may be arranged to monitor rotational position and speed of the crankshaft 15 to determine engine rotational speed (RPM). Another sensor includes a first temperature sensor 11 that is arranged to monitor engine coolant temperature. The first temperature sensor 11 may employ a thermocouple, a thermistor or another suitable temperature-sensing transducer. The actuators of the engine 14 are preferably controlled by an engine controller (ECM) 60. The engine 14 is preferably mechanized with suitable hardware and the ECM 60 preferably includes suitable executable routines to execute autostart and autostop functions, fueled and fuel cutoff (FCO) functions, and all-cylinder and cylinder deactivation functions during ongoing operation of the powertrain system 12. The engine 14 is considered to be in an OFF state when it is not rotating. The engine 14 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and preferably operating with engine exhaust valves in open states to minimize pumping losses, while the remaining cylinders are fueled and fired and thus producing torque. The ON state may include the FCO state in which the engine 14 is spinning and unfueled. The ON state may include the cylinder deactivation state. The ON state may include the FCO state in combination with the cylinder deactivation state. Engine mechanizations and control routines for executing autostart, autostop, FCO and cylinder deactivation routines are known and not described herein.

The transmission 18 may be paired with the engine 14 at an engine-transmission interface, e.g., torque converter 26 or a dual mass fly-wheel employing suitable mechanisms, including fasteners such as threaded screws, bolts and dowels. The transmission 18 includes a transmission case 20 for housing a geartrain 22 that is configured to provide a predetermined number of selectable gear ratios for connecting the engine crankshaft 15 to the drive wheels 16. Operational controls of the transmission 18 and the torque converter 26 are provided by a transmission controller (TCM) 46.

A vehicle controller 70 is arranged to monitor operator inputs and command operation of the ECM 60 and TCM 46 in response. The operator inputs are determined via various operator interface devices, which is depicted as a single element 72. The operator interface 72 preferably includes a plurality of human/machine interface devices through which the vehicle operator commands operation of the vehicle 10, including, by way of non-limiting embodiments, an ignition switch to enable an operator to crank and start the engine 14, an accelerator pedal, a brake pedal, a transmission range selector (PRNDL), a steering wheel, and a headlamp switch. The accelerator pedal provides a signal input including an accelerator pedal position that indicates an operator request for vehicle acceleration. The brake pedal provides signal input including a brake pedal position that indicates an operator request for vehicle braking. The transmission range selector provides signal input that indicates direction of operator-intended motion of the vehicle including a discrete number of operator-selectable positions that indicate the preferred rotational direction of the drive wheels 16 in either a forward or a reverse direction. One of ordinary skill in the art appreciates that the illustrated communication paths and respective functions of the vehicle controller 70, ECM 60, TCM 46, operator interface 72 and the various human/machine interface devices is one example of a configuration for those elements, and other arrangements and communication paths may be suitable within the scope of this disclosure. By way of other non-limiting examples, the accelerator pedal may directly communicate with the ECM 60 and the transmission range selector may directly communicate with the TCM 46.

The vehicle controller 70 may detect an idle state when there is no or minimal operator input to the accelerator pedal, and may detect an off-idle state when there is operator input to the accelerator pedal that is greater than a minimum value. By way of a non-limiting example, an off-idle state may be detected when the operator input to the accelerator pedal is greater than or equal to 5%, and an idle state may be detected when the operator input to the accelerator pedal is less than 5%. The ECM 60 and TCM 46 communicate with the vehicle controller 70 via a suitable communication bus 65. Although not specifically shown, the powertrain 12 may include one or more non-combustion torque machines, e.g., electric motor/generators that generate propulsion torque.

FIG. 2 schematically shows an embodiment of the TCM 46 and a controls subsystem 24 for controlling operation of the transmission 18, including controlling gear shifting. The TCM 46 includes an electric drive system or power module or inverter 28 that is configured to convert DC current of an on-board energy storage device (not shown), such as a battery, into AC current for powering a three-phase electric motor 31. The motor 31 is used to drive a pump 32. Additionally, motor 31 may be incorporated into the pump 32 and be packaged as an integrated electric pump. Although the pump 32 is shown herein as being electrically-driven, a mechanically-driven pump, e.g., a pump that is rotatably coupled to the engine crankshaft 15 may be employed instead. The controls subsystem 24 also includes a body of hydraulic fluid 34 that resides in a transmission valve body 36 and is regulated via a system of valves. The controls subsystem 24 additionally includes an accumulator 38. The accumulator 38 is pre-filled with nitrogen gas 40 that effectively serves as an accumulator spring. The pump 32 is a fixed-displacement unit configured to supply a volume of hydraulic fluid 34 to the accumulator 38. The supplied pressurized hydraulic fluid 34 compresses the nitrogen gas 40 inside the accumulator 38 and is retained by the accumulator for subsequent release to the valve body 36. The valve body 36 controls engagement of transmission clutches by directing the hydraulic fluid 34 to various solenoids 43 and check valves 45, which in turn regulates the flow of hydraulic fluid 34 between the pump 32, the accumulator 38, and the appropriate clutch to effect operation of the transmission 18 at a selected fixed gear ratio. The TCM 46 and controls subsystem 24 may also control other transmission elements, such engaging and disengaging gear synchronizers via forks during gear shifting. Operation of the transmission 18 and the controls subsystem 24 may be monitored, including a second temperature sensor 54 that monitors temperature of the hydraulic fluid 34. Other sensors may include a temperature sensor 55 that monitors temperature of the inverter 28 and a temperature sensor 56 that monitors temperature of the motor 31. Each of the temperature sensors 54, 55 and 56 may be any suitable temperature transducer, including, by way of non-limiting examples, a thermocouple or a thermistor. Operation of the vehicle 10 to provide propulsion torque may generate heat and thermal loading on the various components and subsystems, which is monitored by the temperature sensors 54, 55 and 56.

The TCM 46 and controls subsystem 24 for controlling operation of the transmission 18 is meant to be illustrative, and is provided as one example of a closed hydraulic system. A closed hydraulic system is a hydraulic system that is arranged to supply hydraulic fluid for operational control, such as clutch activation and deactivation, and is fluidly separate from other fluidic subsystems. By way of a non-limiting example, the controls subsystem 24 supplies hydraulic fluid to portions of the transmission 18 of the powertrain system 12 disposed on a vehicle separate from other fluidic subsystems controlling other elements of the transmission 18. The controls subsystem 24 may be monitored by a temperature sensor, e.g., the second temperature sensor 54.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. Data signals may include discrete or digitized analog signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The term "signal" means a detectable physical quantity that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

Figure 4:
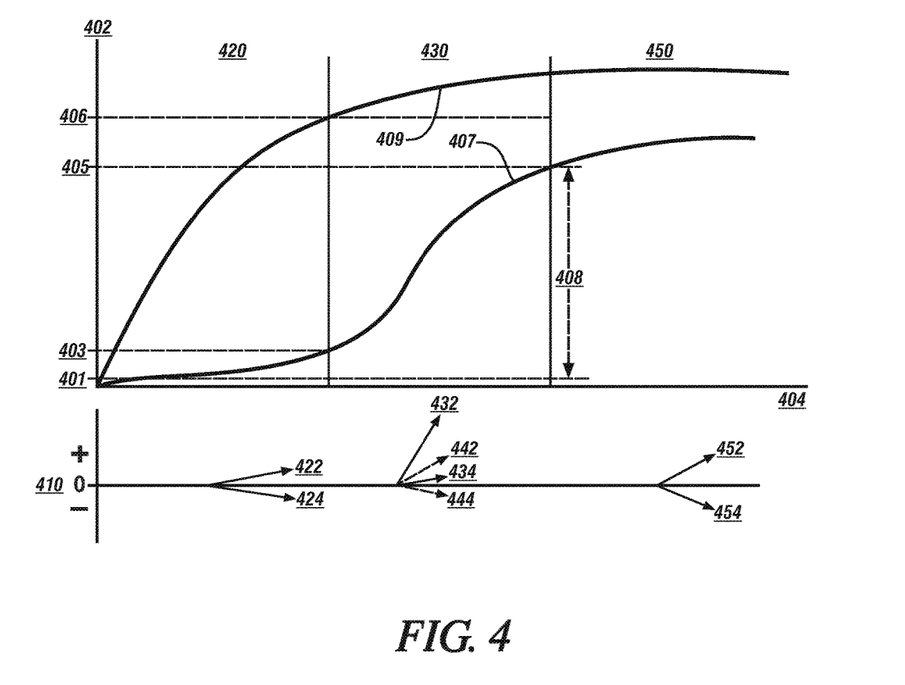
FIG. 4 graphically shows temperatures and associated temperature slope thresholds in relation to powertrain operating time, including ambient temperature, hydraulic fluid temperature and engine coolant temperature that are associated with operation of an embodiment of the powertrain system described with reference to FIGS. 1 and 2, in accordance with the disclosure.

FIG. 4 graphically shows temperatures 402 and associated temperature slope thresholds 410 on the vertical axis, which are plotted in relation to powertrain operating time 404, which is shown on the horizontal axis. The plotted temperatures 402 include ambient temperature 401, hydraulic fluid temperature 407 and corresponding engine coolant temperature 409 that are associated with operation of an embodiment of the powertrain system 12 described with reference to FIGS. 1 and 2.

The behavior of the hydraulic fluid temperature 407 during vehicle operation may be characterized as a slow-changing S-curve when the vehicle 10 executes an engine cold-start and run maneuver. By way of definition, an engine cold-start is an engine starting event, often in response to an operator request, wherein temperatures of the engine 14 and related vehicle systems are substantially equal to the ambient temperature 401. The internal combustion process, clutch activation, and other operations of the engine 14 and transmission 18 generate heat that is transferable to the hydraulic fluid 34 through conductive and convective heat transfer paths, thus affecting the hydraulic fluid temperature 407. The heat transfer effect is primarily positive towards the hydraulic fluid 34, thus increasing the hydraulic fluid temperature 407. However, under certain circumstances, e.g., during engine idle conditions or during an engine autostop event, the heat transfer effect may be neutral or negative, transferring heat away from the hydraulic fluid 34.

The characteristic slow-changing S-curve associated with the hydraulic fluid temperature 407 may be divided into a plurality of temperature regions, with each of the temperature regions associated with operation of the powertrain system, such as may be indicated by engine coolant temperature 409 or another suitable parameter. The temperature regions may include a cold-start region (R1) 420, a warm-up region (R2) 430, and a steady-state region (R3) 450. Region R1 420 is indicated during vehicle operation after an engine cold-start event, and is characterized by operating temperatures that are at or near the ambient temperature 401. Region R1 420 ends when the hydraulic fluid temperature 407 is greater than a low threshold temperature 403, wherein the low threshold temperature 403 indicates that various powertrain subsystems have warmed up and are expelling heat. By way of example, the low threshold temperature 403 may be related to the engine coolant temperature 409 achieving an engine threshold temperature 406, which may indicate that the engine 14 has reached a warmed-up temperature. The engine threshold temperature 406 may be associated with opening of a coolant system thermostatic device in certain embodiments. Region R2 430 is indicated during vehicle operation when the hydraulic fluid temperature 407 is greater than the low threshold temperature 403, and is steadily increasing. Region R2 430 ends when the hydraulic fluid temperature 407 is greater than an upper threshold temperature 405, wherein the upper threshold temperature 405 is selected to indicate that the hydraulic fluid temperature 407 is greater than a threshold temperature. In certain embodiments, the hydraulic fluid temperature 407 may be an absolute measurement of temperature, and the low threshold temperature 403 and the upper threshold temperature 405 may be indicated by a differential hydraulic fluid temperature value ($\Delta$TFT) 408 that is determined in relation to the ambient temperature 401. Region R3 450 is indicated during vehicle operation when the hydraulic fluid temperature 407 is greater than the upper threshold temperature 405.

Minimum and maximum temperature slope thresholds are associated with each of the Regions R1 420, R2 430 and R3 450, including a minimum cold-start slope 424, a maximum cold-start slope 422, a minimum warm-up off-idle slope 434, a maximum warm-up off-idle slope 432, a minimum warm-up idle slope 444, a maximum warm-up idle slope 442, a minimum steady-state slope 454 and a maximum steady-state slope 452. The minimum and maximum temperature slope thresholds associated with each of the Regions R1 420, R2 430 and R3 450 may be determined during vehicle development and stored in a non-volatile computer memory device for retrieval during vehicle operation.

The minimum cold-start slope 424 and the maximum cold-start slope 422 indicate a range of expected changes in temperature during vehicle operation in Region R1 420, taking into account application-specific factors related to heat transfer to the hydraulic fluid 34 through conductive and convective heat transfer paths during the vehicle operation after an engine cold-start event. A measured temperature slope that is less than the minimum cold-start slope 424 or greater than the maximum cold-start slope 422 may indicate an in-range fault in the second temperature sensor 54, which is disposed to monitor the hydraulic fluid 34 in the controls subsystem 24. The maximum cold-start slope 422 has a positive value during cold-start operation. As indicated, there may be instances wherein the minimum cold-start slope 424 has a negative value during cold-start operation under some operating conditions.

The minimum warm-up off-idle slope 434 and the maximum warm-up off-idle slope 432 indicate a range of expected changes in temperature during vehicle operation in Region R2 430 when the vehicle is operating in an off-idle state, taking into account application-specific factors related to heat transfer to the hydraulic fluid 34 through conductive and convective heat transfer paths during the vehicle operation during engine warm-up. A measured temperature slope that is less than the minimum warm-up off-idle slope 434 or greater than the maximum warm-up off-idle slope 432 may indicate an in-range fault in the second temperature sensor 54, which is disposed to monitor the hydraulic fluid 34 in the controls subsystem 24. As indicated, the minimum warm-up off-idle slope 434 and the maximum warm-up off-idle slope 432 have positive values.

The minimum warm-up idle slope 444 and the maximum warm-up idle slope 442 indicate a range of expected changes in temperature during vehicle operation in Region R2 430 when the vehicle is operating with the engine 14 in an idle state, taking into account application-specific factors related to heat transfer to the hydraulic fluid 34 through conductive and convective heat transfer paths during engine operation during warm-up. A measured temperature slope that is less than the minimum warm-up idle slope 444 or greater than the maximum warm-up idle slope 442 may indicate an in-range fault in the second temperature sensor 54, which is disposed to monitor the hydraulic fluid 34 in the controls subsystem 24. As indicated, the minimum warm-up idle slope 444 may have a negative value and the maximum warm-up idle slope 442 has a positive value.

The minimum warm-up idle slope 444 and the maximum warm-up idle slope 442 may also indicate a range of expected changes in temperature during vehicle operation in Region R2 430 when the vehicle is operating with the engine 14 in the OFF state. In certain embodiments, the magnitudes of minimum warm-up idle slope 444 and the maximum warm-up idle slope 442 may vary for operation when the vehicle is operating with the engine 14 in the OFF state in comparison with operation when the vehicle is operating with the engine 14 in the idle state. The minimum steady-state slope 454 and the maximum steady-state slope 452 indicate a range of expected changes in temperature during vehicle operation in Region R3 450, taking into account application-specific factors related to heat transfer to the hydraulic fluid 34 through conductive and convective heat transfer paths during the vehicle operation after achieving a steady-state, warmed-up engine operating condition. A measured temperature slope that is less than the minimum steady-state slope 454 or greater than the maximum steady-state slope 452 may indicate an in-range fault in the second temperature sensor 54, which is disposed to monitor the hydraulic fluid 34 in the controls subsystem 24. The maximum steady-state slope 452 has a positive value during steady-state operation. As indicated, there may be instances wherein the minimum steady-state slope 454 has a negative value during steady-state operation under some operating conditions.

Figure 3:
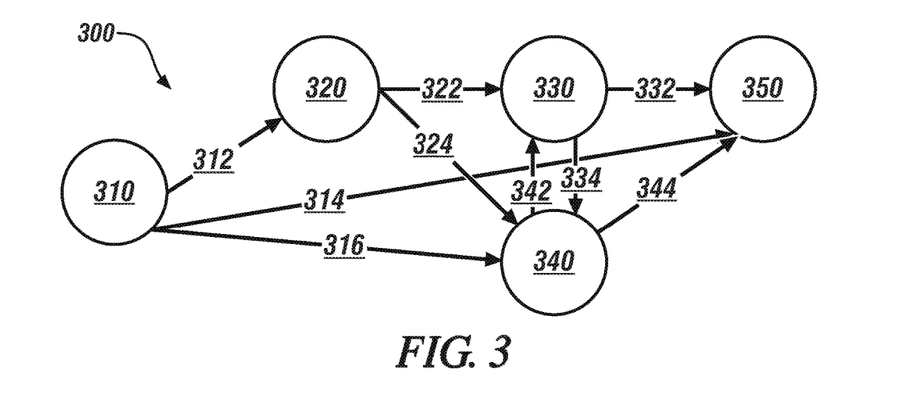
FIG. 3 schematically illustrates a state machine for evaluating temperature sensor performance, in accordance with the disclosure.

Referring to FIG. 3, with continued reference to FIG. 4, a state machine 300 for evaluating temperature sensor performance is schematically shown. The state machine 300 may be implemented as a plurality of routines in one of the controllers, e.g., the ECM 60, to monitor and evaluate signal rationality of a temperature sensor that is employed to monitor temperature of a hydraulic fluid. By way of example, the state machine 300 for evaluating temperature sensor performance may be employed to evaluate signals from the second temperature sensor 54 that is disposed to monitor the hydraulic fluid 34 in the controls subsystem 24 described with reference to FIGS. 1 and 2. The state machine 300 preferably has five states, including an initial state 310, a first state 320, a second state 330, a third state 340, and a fourth state 350, wherein each of the states is associated with one of the temperature regions indicated by the characteristic slow-changing S-curve associated with the hydraulic fluid temperature 407 described with reference to FIG. 4. As such, the first state 320 is associated with the cold-start region (R1) 420, the second state 330 and the third state 340 are associated with the warm-up region (R2) 430, and the fourth state 350 is associated with the steady-state region (R3) 450.

The state machine 300 initiates execution in the initial state 310 upon detecting a vehicle key-on event, e.g., as initiated by an operator. During the initial state 310, the state machine 300 evaluates various engine operating parameters, including an engine-off time, the engine key-off state of the state machine 300 at the time of an immediately previous engine key-off event, the initial fluidic temperature indicated by the second temperature sensor 54, and the initial engine coolant temperature indicated by the first temperature sensor 11. The state machine 300 executes in the first state 320 when the engine-off time is greater than a minimum threshold, e.g., 6 hours, or the initial engine coolant temperature is less than a threshold, e.g., 75 C, or the engine key-off state was the first state 320 (312). The state machine 300 executes in the third state 340 when the engine key-off state was the second state 330 or the third state 340, and the engine-off time is less than the minimum threshold, e.g., 6 hours, and the initial engine coolant temperature is greater than the threshold, e.g., 75 C (316). The state machine 300 executes in the fourth state 350 when the engine key-off state was the fourth state 350, and the engine-off time is less than the minimum threshold, e.g., 6 hours, and the initial engine coolant temperature is greater than the threshold, e.g., 75 C (314).

When executing in the first state 320, the state machine 300 transitions to executing in the second state 330 when the engine coolant temperature is greater than an engine threshold temperature 406, e.g., 75 C, for a period of time, e.g., 120 seconds, and the engine 14 is not operating at idle (322). Otherwise, the state machine 300 transitions to executing in the third state 340 when the engine coolant temperature is greater than an engine threshold temperature 406, e.g., 75 C, for a period of time, e.g., 120 seconds, and the engine 14 is operating at idle (324). When executing in the second state 330, the state machine 300 transitions to executing in the third state 340 when the engine 14 is operating at idle, or when the engine 14 executes an engine autostop routine (334). Due to time-delayed change of the hydraulic temperature in response to entering into or exiting from the engine idle state, there may be a timer associated with the idle and the off-idle conditions. For example, the idle state transition criteria may include operating at engine idle for three consecutive minutes, and the off-idle state transition criteria may include operating at the engine off idle condition for four consecutive minutes. Otherwise, the state machine 300 transitions from the second state 330 to the fourth state 350 when the differential hydraulic fluid temperature ($\Delta$TFT) 408 is greater than a threshold differential temperature, or the hydraulic fluid temperature 407 is greater than the upper threshold temperature 405 (332). Similarly, the state machine 300 transitions from the third state 340 to the fourth state 350 when the differential hydraulic fluid temperature ($\Delta$TFT) 408 is greater than a threshold differential temperature, or the hydraulic fluid temperature 407 is greater than the upper threshold temperature 405 (344). When executing in the third state 340, the state machine 300 transitions to executing in the second state 330 when the engine 14 is no longer operating at idle or when the engine 14 executes an engine autostart routine (342).

During execution in each of the first state 320, second state 330, third state 340, and fourth state 350, the state machine 300 monitors signals from the second temperature sensor 54, wherein the second temperature sensor 54 is disposed to monitor the temperature of the hydraulic fluid 34. Monitoring the signals from the second temperature sensor 54 preferably includes periodically monitoring and storing, in a memory device, raw sensor signals that have been digitized by the analog/digital converter of the TCM 46 prior to being subjected to any signal processing such as filtering or averaging. The periodic monitoring of sensor signals includes monitoring the sensor signals, periodically sampling the sensor signals, determining the temperature state based upon a temperature/sensor signal calibration for the second temperature sensor 54, and calculating an indicated temperature slope ΔT/Δt based upon a temperature change indicated by the sensor signal over an extended period of time, as follows:

$$\Delta T/\Delta t \qquad [1]$$

wherein:
ΔT represents the indicated temperature change, and
Δt represents the extended period of time, e.g., every thirty seconds.

The indicated temperature slope ΔT/Δt is evaluated by comparing it with minimum and maximum threshold temperature slopes that are specific to the first state 320, the second state 330, the third state 340, and the fourth state 350. This includes comparing the indicated temperature slope ΔT/Δt to the minimum cold-start slope 424 and the maximum cold-start slope 422 when the vehicle is operating in Region R1 420. This further includes comparing the indicated temperature slope ΔT/Δt to the minimum warm-up off-idle slope 434 and the maximum warm-up off-idle slope 432 when the vehicle is operating in Region R2 430 under off-idle conditions. This further includes comparing the indicated temperature slope ΔT/Δt to the minimum warm-up idle slope 444 and the maximum warm-up idle slope 442 when the vehicle is operating in Region R2 430 under idle conditions. This further includes comparing the indicated temperature slope ΔT/Δt to the minimum steady-state slope 454 and the maximum steady-state slope 452 when the vehicle is operating in Region R3 450.

A fault associated with the second temperature sensor 54 may be detected when the indicated temperature slope ΔT/Δt is less than the minimum cold-start slope 424 or greater than the maximum cold-start slope 422 when the vehicle is operating in Region R1 420. A fault associated with the second temperature sensor 54 may be detected when the indicated temperature slope ΔT/Δt is less than the minimum warm-up off-idle slope 434 and the maximum warm-up off-idle slope 432 when the vehicle is operating in Region R2 430 under off-idle conditions. A fault associated with the second temperature sensor 54 may be detected when the indicated temperature slope ΔT/Δt is less than the minimum warm-up idle slope 444 and the maximum warm-up idle slope 442 when the vehicle is operating in Region R2 430 under idle conditions. A fault associated with the second temperature sensor 54 may be detected when the indicated temperature slope ΔT/Δt is less than the minimum steady-state slope 454 and the maximum steady-state slope 452 when the vehicle is operating in Region R3 450. As such, the state machine 300 for evaluating temperature sensor performance may be employed to detect various faults that may be associated with sensor operation, including, e.g., stuck at a low in-range constant value or at a high in-range constant value, or an unexpected change in temperature, either in an increasing temperature state or a decreasing temperature state.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

The state machine 300 and related flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring a temperature sensor disposed to monitor temperature of hydraulic fluid for a transmission of a powertrain system, the method comprising:
monitoring engine operation including an engine coolant temperature;
monitoring a signal output from the temperature sensor;
determining an indicated temperature slope based upon the signal output from the temperature sensor;
selecting a temperature region based upon the engine coolant temperature;
determining minimum and maximum temperature slope thresholds associated with the selected temperature region; and
evaluating, via a controller, performance of the temperature sensor based upon the indicated temperature slope and the minimum and maximum temperature slope thresholds.

2. The method of claim 1, wherein determining an indicated temperature slope based upon the signal output from the temperature sensor comprises:
periodically sampling signals output from the temperature sensor;
determining, for each sampled signal, a temperature based upon a temperature/sensor signal calibration for the temperature sensor; and
determining the indicated temperature slope based upon a difference between the sampled signals and the sampling period, wherein the sampling period is an extended period of time.

3. The method of claim 2, wherein the sampling period being an extended period of time comprises the sampling period being greater than 10 seconds.

4. The method of claim 1, wherein selecting a temperature region based upon the engine coolant temperature comprises selecting one of a cold-start state, a warm-up state and a steady state based upon the engine coolant temperature.

5. The method of claim 1, further comprising:
determining an engine operating state; and
determining minimum and maximum temperature slope thresholds associated with the selected temperature region and the engine operating state.

6. The method of claim 5, wherein determining an engine operating state comprises detecting the engine is operating in an idle state;
and further comprising determining minimum and maximum temperature slope thresholds associated with the selected temperature region with the engine operating in the idle state.

7. The method of claim 5, wherein determining an engine operating state comprises detecting the engine is operating in an off-idle state;
and further comprising determining minimum and maximum temperature slope thresholds associated with the selected temperature region with the engine operating in the off-idle state.

8. The method of claim 5, wherein determining an engine operating state comprises detecting the engine is operating in an off-idle state;
and further comprising determining minimum and maximum temperature slope thresholds associated with the selected temperature region with the engine operating in the OFF state.

9. The method of claim 1, further comprising detecting a fault with the temperature sensor when the indicated temperature slope is greater than the maximum temperature slope threshold associated with the temperature region.

10. The method of claim 1, further comprising detecting a fault with the temperature sensor when the indicated temperature slope is less than the minimum temperature slope threshold associated with the temperature region.

11. A powertrain system, comprising:
an internal combustion engine coupled to a transmission;
a first temperature sensor disposed to monitor engine coolant temperature;
a second temperature sensor disposed to monitor temperature of hydraulic fluid for the transmission,
a controller in communication with the internal combustion engine and the first and second temperature sensors, the controller including an instruction set, the instruction set executable to:
monitor operation of the internal combustion engine;
monitor signal outputs from the first and second temperature sensors;
determine an indicated temperature slope for the second temperature sensor based upon the signal output from the second temperature sensor;
select a temperature region based upon the signal output from the first temperature sensor;
determine minimum and maximum temperature slope thresholds associated with the selected temperature region; and
evaluate performance of the second temperature sensor based upon the indicated temperature slope and the minimum and maximum temperature slope thresholds associated with the selected temperature region.

12. The powertrain system of claim 11, wherein the instruction set executable to determine an indicated temperature slope for the second temperature sensor based upon the signal output from the second temperature sensor comprises:
periodically sample signals output from the second temperature sensor;
determine, for each sampled signal, a temperature based upon a temperature/sensor signal calibration for the second temperature sensor; and
determine the indicated temperature slope based upon a difference between the sampled signals and the sampling period, wherein the sampling period is an extended period of time.

13. The powertrain system of claim 12, wherein the sampling period being an extended period of time comprises the sampling period being greater than 10 seconds.

14. The powertrain system of claim 11, wherein the instruction set executable to select a temperature region based upon the engine coolant temperature comprises the instruction set executable to select one of a cold-start state, a warm-up state and a steady state based upon the engine coolant temperature indicated by the first temperature sensor.

15. The powertrain system of claim 11, further comprising the instruction set executable to:
determine an engine operating state; and
determine the minimum and maximum temperature slope thresholds associated with the selected temperature region and the engine operating state.

16. The powertrain system of claim 15, wherein the instruction set executable to determine an engine operating state comprises the instruction set executable to detect the engine is operating in an idle state; and further comprising the instruction set executable to determine minimum and maximum temperature slope thresholds associated with the selected temperature region with the engine operating in the idle state.

17. The powertrain system of claim 15, wherein the instruction set executable to determine an engine operating state comprises the instruction set executable to detect the engine is operating in an off-idle state; and further comprising the instruction set executable to determine minimum and maximum temperature slope thresholds associated with the selected temperature region with the engine operating in the off-idle state.

18. The powertrain system of claim 15, wherein the instruction set executable to determine an engine operating state comprises the instruction set executable to detect the engine is operating in an off-idle state; and further comprising the instruction set executable to determine minimum and maximum temperature slope thresholds associated with the selected temperature region with the engine operating in the OFF state.

19. The powertrain system of claim 11, further comprising the instruction set executable to detect a fault with the second temperature sensor when the indicated temperature slope is greater than the maximum temperature slope threshold associated with the temperature region.

20. The powertrain system of claim 11, further comprising the instruction set executable to detect a fault with the second temperature sensor when the indicated temperature slope is less than the minimum temperature slope threshold associated with the temperature region.

* * * * *